(12) United States Patent
Jameson

(10) Patent No.: US 7,447,703 B2
(45) Date of Patent: Nov. 4, 2008

(54) COLLECTION INFORMATION MANAGER

(75) Inventor: Kevin Wade Jameson, Calgary (CA)

(73) Assignee: Coverity, Inc., San Francisco, CA (US)

( * ) Notice: Subject to any disclaimer, the term of this patent is extended or adjusted under 35 U.S.C. 154(b) by 2141 days.

(21) Appl. No.: 09/885,078

(22) Filed: Jun. 21, 2001

(65) Prior Publication Data

US 2002/0198770 A1 Dec. 26, 2002

(51) Int. Cl.
*G06F 17/00* (2006.01)
*G06F 7/00* (2006.01)

(52) U.S. Cl. .................................................. 707/104.1
(58) Field of Classification Search ........................ None
See application file for complete search history.

(56) References Cited

U.S. PATENT DOCUMENTS

| | | | | |
|---|---|---|---|---|
| 6,701,294 | B1 * | 3/2004 | Ball et al. | 704/257 |
| 6,768,989 | B2 * | 7/2004 | Jameson | 707/3 |
| 6,807,558 | B1 * | 10/2004 | Hassett et al. | 709/203 |
| 6,917,947 | B2 * | 7/2005 | Jameson | 707/104.1 |
| 6,934,694 | B2 * | 8/2005 | Jamieson | 706/20 |
| 6,975,914 | B2 * | 12/2005 | DeRemer et al. | 700/96 |
| 6,999,876 | B2 * | 2/2006 | Lambert et al. | 702/2 |
| 7,003,759 | B2 * | 2/2006 | Jameson | 717/120 |
| 7,017,162 | B2 * | 3/2006 | Smith et al. | 719/328 |
| 7,020,644 | B2 * | 3/2006 | Jameson | 706/47 |
| 7,024,199 | B1 * | 4/2006 | Massie et al. | 455/445 |
| 7,136,642 | B1 * | 11/2006 | Massie et al. | 455/428 |
| 7,162,238 | B1 * | 1/2007 | Massie et al. | 455/432.3 |
| 7,242,991 | B2 * | 7/2007 | Budinger et al. | 700/95 |

OTHER PUBLICATIONS

Automated quality assurance for document understanding systems Yacoub, S.; Software, IEEE vol. 20, Issue 3, May-Jun. 2003 pp. 76-82 Digital Object Identifier 10.1109/MS.2003.1196325.*

Video data mining: semantic indexing and event detection from the association perspective Xingquan Zhu; Xindong Wu; Elmagarmid, A.K.; Zhe Feng; Lide Wu; Knowledge and Data Engineering, IEEE Transactions on vol. 17, Issue 5, May 2005 pp. 665-677 Digital Object Identifier 10.1109/TKDE.2005.83.*

A Content Based Pattern Analysis System for a Biological Specimen Collection Mallik, J.; Samal, A.; Gardner, S.L.; Data Mining Workshops, 2007. ICDM Workshops 2007. Seventh IEEE International Conference on Oct. 28-31, 2007 pp. 107-112 Digital Object Identifier 10.1109/ICDMW.2007.69.*

A Novel WSDM-based Content Service Status Monitoring Scheme in Content Federation Architecture ZhiHui Lv; Jie Wu; WeiMing Fu; YiPing Zhong; Grid and Cooperative Computing Workshops, 2006. GCCW '06. Fifth International Conference on Oct. 2006 pp. 549-556 Digital Object Identifier 10.1109/GCCW.2006.10.*

* cited by examiner

*Primary Examiner*—Michael B Holmes
(74) *Attorney, Agent, or Firm*—Manatt, Phelps & Phillips, LLP

(57) ABSTRACT

Collection information managers improve the productivity of knowledge workers by organizing information about arbitrary collections of computer files into collection data structures, for use by automated collection processing programs. Three kinds of knowledge are obtained and organized by collection information managers: collection instance information, collection content information, and collection processing information. Software programs can use information in collection data structures to precisely understand and process collections in useful ways that were not previously possible.

20 Claims, 7 Drawing Sheets

```
1      c:\collections
2          notes.txt
3          myletter.doc
┌───────────────────────────────────────┐  100
│  4      c-myhomepage                   │ /
│  5          cspec                      │
│  6          s                          │
│  7              homepage.html          │
│  8              myphoto.jpg            │
└───────────────────────────────────────┘
```

FIG. 1
PRIOR ART
```
1    c:\collections
2        notes.txt
3        myletter.doc
4        c-myhomepage
5
6          s
7            homepage.html
8            myphoto.jpg
```
FIG. 2
```
1    c:\collections
2        notes.txt
3        myletter.doc
```
```
4        c-myhomepage
5          cspec
6          s
7            homepage.html
8            myphoto.jpg
```
FIG. 3
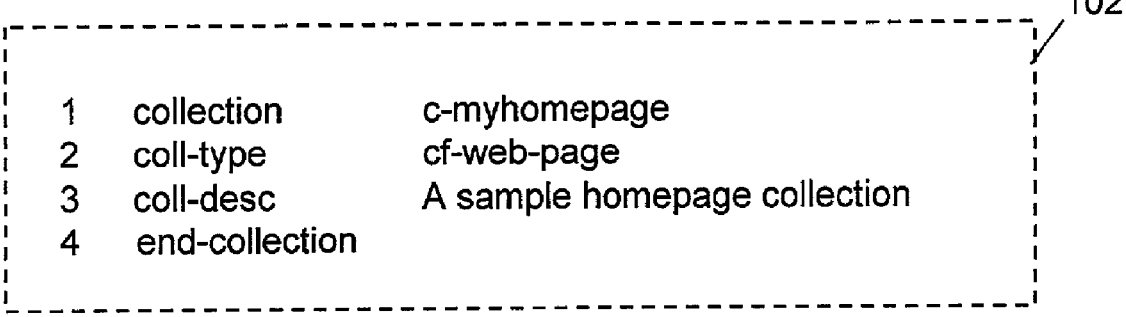
```
1    collection       c-myhomepage
2    coll-type        cf-web-page
3    coll-desc        A sample homepage collection
4    end-collection
```

FIG. 8

```
1   /* collection data structure */
2   collection-info {

3      + specifier_info
4         + coll-type-indicator
5         + other specifier information ...

6      + content_info
7         + content_location_info ...
8         + content_members ...
9         + other content information...

10     + other collection structure information...
11  }
```

FIG. 9

```
1   /* collection type definition data structure */
2   collection-type-definition-info {

3      + coll-type-name
4      + collection internal structure info ...
5      + collection content location info ...
6      + collection content type recognition info ...

7      + other collection type definition information...
8   }
```

FIG. 10

| | KEY | VALUE |
|---|---|---|
| 1 | /* collection type internal structure definitions */ | |
| 2 | dir_source_files | .\s |
| 3 | dir_doc_files | .\doc |
| | | |
| 4 | /* content location definitions (per-type content links) */ | |
| 5 | content_subtree_http | http://host.com/some/dir/name |
| 6 | content_subtree_ftp | ftp://host.com/some/dir/name |
| 7 | content_subtree_nfs | /some/local/directory/name |
| | | |
| 8 | /* content type recognition definitions */ | |
| 9 | content_policy | subtree_below_cspec_file |
| 10 | content_file_type | .c    file_cpp |
| 11 | content_file_type | .c    file_c |
| 12 | content_file_type | .h    file_c_include |
| 13 | content_file_type | .doc  file_ms_word |
| 14 | content_file_type | .html file_html |
| 15 | content_file_type | .xls  file_ms_excel |
| | | |
| 16 | /* collection processing definitions */ | |
| 17 | compile_c_files | yes |
| 18 | compiler_windows | vc++ |
| 19 | compiler_unix | gcc |
| 20 | build platforms | Win98, Win2000, linux |
| 21 | process files | compile link |
| 22 | link libraries | stdio math sock |
| | | |
| 23 | /* results dispatching definitions */ | |
| 24 | results_ftp_host | ftp.output.com |
| 25 | results_ftp_dir | c:\ftphome\collection\results |

FIG. 11

```
1   /* Obtain and load collection specifier instance information */
2   Identify collection specifier text file
3   Open, read, and parse specifier information
4   Load specifier information into data structure
5   Close collection specifier text file.

6   /* Obtain and load collection type definition information */
7   Obtain collection type indicator from spec info
8   Use indicator to identify collection type definition file
9   Open, read, and parse collection type definition information
10  Load collection type definition into data structure
11  Close collection type definition text file.

12  /* Obtain and load collection content attribute information */
13  Obtain content info from type definition
14  Use content attribute info to identify content files
15  Load content info into data structure 16  Make data structures containing collection instance,
    collection type, and collection content attribute info
    available to the application program for processing the collection.
```

FIG. 12

| COLLECTION CATEGORY | HAS TYPE | HAS CONTENT | DESCRIPTION |
|---|---|---|---|
| 1 | 1 | 1 | (most common) normal coll |
| 2 | 1 | 0 | (most common) normal cspec only |
| 3 | 0 | 1 | (rare) untyped temporary collection |
| 4 | 0 | 0 | (rare) untyped cspec only (Common as an initial starting point for programs that generate collections from nothing.) |

COLLECTION INFORMATION MANAGER

CROSS REFERENCES TO RELATED APPLICATIONS

Not applicable.

FIELD OF THE INVENTION

This invention relates to automated software systems for processing collections of computer files in arbitrary ways, thereby improving the productivity of software developers, web media developers, and other humans and computer systems that work with collections of computer files.

BACKGROUND OF THE INVENTION

The general problem addressed by this invention is the low productivity of human knowledge workers who use labor intensive manual processes to work with collections of computer files. One promising solution strategy for this software productivity problem is to build automated systems to replace manual human effort.

Unfortunately, replacing arbitrary manual processes performed on arbitrary computer files with automated systems is a difficult thing to do. Many challenging subproblems must be solved before competent automated systems can be constructed. As a consequence, the general software productivity problem has not been solved yet, despite large industry investments of time and money over several decades.

The present invention provides one piece of the overall functionality required to implement automated systems for processing collections of computer files. In particular, the current invention has a practical application in the technological arts because it provides a convenient, scalable, and fully automated software means for associating three kinds of information important to automated collection processing systems: collection instance specifier information, collection type definition information, and collection content information.

The Collection Information Management problem is one of the most important and fundamental problems that must be solved in order to enable the construction of automated collection processing systems. It is the problem how to model and manage information about collection instances, collection content files, and collection data types that describe shared characteristics of collection instances.

Some interesting aspects of the collection information management problem include the following: large numbers of collections can exist; collections can have arbitrary per-instance specifier data; collections can contain many arbitrary computer files for content; collections can require that arbitrary processes be run on the collection content; collections can share sets of structural and processing characteristics; many software programs can require access to information about collections; collection representations must accommodate variances in computing platforms, administrative policies, and software processing tools; and collections must be resistant to scale up failure.

General Shortcomings of the Prior Art

A professional prior art search for the present invention was performed, but produced no relevant works of prior art. Therefore the following discussion is general in nature, and highlights the significant conceptual differences between file-oriented mechanisms in the prior art and the novel collection-oriented mechanisms represented by the present invention.

Prior art approaches lack support for collections. This is the largest limitation of all because it prevents the use of high-level collection abstractions that can significantly improve productivity.

Prior art approaches lack modeling flexibility. They cannot model variance in computing platforms, software tools, site process conventions, administrative policies, or computational process structures. Generalized modeling of variance of data, systems, and processes is a difficult permutation problem with combinatorial characteristics.

Prior art approaches lack support for reuse of general process knowledge, thereby making it difficult to reuse existing human knowledge in future situations. Lack of knowledge reuse support can be seen in situations where humans are still manually recognizing, responding, and controlling the routine processing of routine computer files.

Prior art approaches have limited automation power. Specifically, they cannot deliver practical amounts of automation in the presence of the large amounts of data file and process variance found within common industrial systems and processes.

Prior art approaches have limited scale-up capability. Specifically, prior art solutions conceived for small, localized problems usually suffer scale-up failure when faced with industrial situations that involve large amounts of variance. The problem of scale-up failure is well known within the software industry.

As can be seen from the above, prior art mechanisms in general have several important disadvantages. Notably, prior art approaches do not support collections of files, and do not provide sufficient modeling of variance. These are the two most important limitations of all.

In contrast, the present collection information manager invention has none of these limitations, as the following disclosure will show.

Specific Shortcomings in Prior Art

Several general examples of prior art approaches for managing multiple computer files are discussed below. The examples include: (a) archive files such as ZIP and TAR files, (b) configuration management repositories of computer files, and (c) application program project files for IDEs (Integrated Development Environments) for developing software programs.

Archive files such as ZIP and TAR are individual computer files that contain a plurality of other computer files. The purpose of archive files is mainly to group sets of files together for more efficient handling and disk storage. For many common computer operations such as copying and storing, it is easier to work with one file than with many files.

Archive files do not play a significant role in the general automated processing of files stored within the archives. For example, typical external application programs do not read the archive file to determine internal file attributes such as file descriptions, user-defined data types, user-defined processing policies, or other characteristics of files stored within the archive.

Configuration management systems store successive versions and relationships among related files, and are generally capable of identifying and managing a group of related files as a single symbolic set. Common processing operations on the set include checking in, checking out, comparing, locking, and merging revisions of the set.

Configuration management systems do not play a significant role in the general automated processing of files that are stored within configuration management systems. For example, application programs typically do not ask configuration management systems about the types of files in symbolic sets, nor about how the files should be processed for various user application purposes.

Application project files such as those used for IDEs (Integrated Development Environments) contain detailed information about files that are members of the IDE project, for sole use by the IDE application program. For example, IDE project files typically contain information about (a) filenames and pathnames of project members, (b) symbolic file types of project members (eg. source file vs. library file), (c) default processes to apply to each project member (eg. compile or link), and (d) products that should be produced from the project (eg. library output files and executable programs).

IDE project files clearly do play a significant role in the specific, but largely interactive, processing of project file members. Even so, application project files still have several important disadvantages.

Project files lack project-level modeling power. That is, users cannot define a project data type for the whole project file. Instead, project files have a fixed data type that is implied by the program that created the file. Typically, project files contain information that can only be understood by the particular IDE programs that created the project files.

Project files lack sharable project type definitions. That is, there is no way to share a single copy of information among a set of project files. Thus multiple copies of information are required, one copy per project file. Multiple copies of information cause the usual synchronization, propagation, and upgrade problems as information within the multiple copies evolves.

Project files cannot adopt local site project policies. Specifically, project type preference information stored at a receiving site cannot be applied to incoming mobile project files that arrive at the site. This limitation exists because incoming project file information is encapsulated within the project file itself, and cannot be accessed by typical application programs. As a consequence of this limitation, incoming project files cannot adopt the local project policies at the receiving site, and cannot be processed until they are manually modified to adopt local processing conventions.

Project file information is not generally sharable among external application programs. This is because project files are closed containers that can only be used by the application program that created them. This is a significant limitation because many application programs can benefit from having access to general knowledge about collections of related computer files.

Project files are not generally extensible. No extension support is provided because there is no need for extension, since only one application program can use the project file. Thus it follows that human users cannot add new project types, add new processing sequences, or add new information in project files to better satisfy local site processing needs.

As can be seen from the above description, project files have several important disadvantages. In general, project files are non-extensible and non-sharable. They have no user-definable project type data at the project level, cannot share internal project content, cannot be shared by general application programs, and cannot adopt local site conventions when arriving at a receiving site.

In contrast, the present Collection Information Manager invention has none of these limitations, as the following disclosure will show.

SUMMARY OF THE INVENTION

Collection information managers improve the productivity of knowledge workers in the information industry by organizing information about arbitrary collections of computer files into collection data structures, for use by automated collection processing programs.

Collection information is comprised of three major types of related information: (a) a collection specifier that contains organized information about one collection instance, including a collection type indicator that links to a collection type definition; (b) a collection type definition that defines detailed information about characteristics shared by all collections of a particular collection type, and (c) zero or more collection content files that comprise the information content of a collection.

In operation, collection information managers analyze collections of computer files to produce information-rich collection data structures for use by application programs. Application programs subsequently use the collection data structures to understand and process collections in practical, useful ways.

As a consequence of using collection data structures, automated programs can perform more complex software processes than were previously possible, thereby improving the productivity of human knowledge workers. It follows that as manual human processes are replaced by automated collection processing systems, corresponding amounts of human effort will be freed for other purposes.

OBJECTS AND ADVANTAGES

Collection Information Managers solve the prior art limitations described above. Specifically, collection information managers support collections, provide extensive modeling flexibility, reuse existing process knowledge, and deliver scalable automation power.

In addition, collection information managers also produce collection data structures that provide these additional advantages: collection data structures can be shared among multiple application programs; they support user-definable collection types; they support sharable collection types; they can adopt local site policies defined by local collection types; and they are completely extensible to satisfy local site processing needs.

The main object of collection information managers is to obtain, associate, and provide three kinds of collection information to application programs: (1) collection instance information, (2) collection content information, and (3) collection processing information. The detailed collection information provided by collection data structures enables application programs to carry out complex automated processes that were not previously possible.

Another object is to provide a novel means for modeling collections of computer files, thereby enabling knowledge workers to work at a higher level of abstraction. Workers can treat whole collections of files with single operations instead of treating individual files with repetitive identical operations.

Another object is to provide user-defined collection types, thereby enabling application programs to precisely process collections in ways that were not previously possible.

Another object is to provide a novel means for modeling variance in data files, computing platforms, software processes, and administrative policies. Collections enable a single conceptual model to be used for many different application programs.

Another object is to provide collection modeling mechanisms that have sufficient capacity, flexibility, and extensibility to be strongly resistant to scale-up failure. Collections enable automated collection processing systems to scale up smoothly with reduced risk of scale-up failure.

Another object is to provide a means for making human situation-recognition and situation-response knowledge more available to programs than was previously possible. Collection information contained in collection data structures enables automated systems to use existing knowledge to recognize and respond to recurring computational situations in more productive ways than were previously possible.

Another object is to enable more process automation to be used than was previously possible, especially in difficult processing situations involving large variances in data files, processes, and computing platforms.

As can be seen from the objects above, collection information managers provide application programs with detailed knowledge about collection instances, collection contents, and collection processing policies. Armed with such detailed collection knowledge, application programs can execute complex, arbitrary, automated computer processes that were not previously possible.

Further advantages of the present Collection Information Manager invention will become apparent from the drawings and disclosure below.

BRIEF DESCRIPTION OF DRAWINGS

FIG. 1 shows a sample prior art filesystem folder in a typical personal computer filesystem.

FIG. 2 shows how a portion of the prior art folder in FIG. 1 has been converted into a collection 100 by the addition of a collection specifier file 102 named "cspec" FIG. 2 Line 5.

FIG. 3 shows an example physical representation of a collection specifier 102, implemented as a simple text file such as would be used on a typical personal computer filesystem.

FIG. 8 shows an example software collection datastructure that relates collection specifier and collection content information for a single collection instance.

FIG. 9 shows an example collection type definition datastructure, such as might be used by software programs that process collections.

FIG. 10 shows a more detailed example of the kinds of information found in collection type definitions and collection type definition datastructures such as shown in FIG. 9.

FIG. 11 shows an example algorithm for how a collection information manager obtains, associates, and provides collection instance, type, and content information to an application program.

FIG. 12 shows 4 important categories of collections, organized by the two collection properties of collection type and collection content.

LIST OF DRAWING REFERENCE NUMBERS

Figure 4:
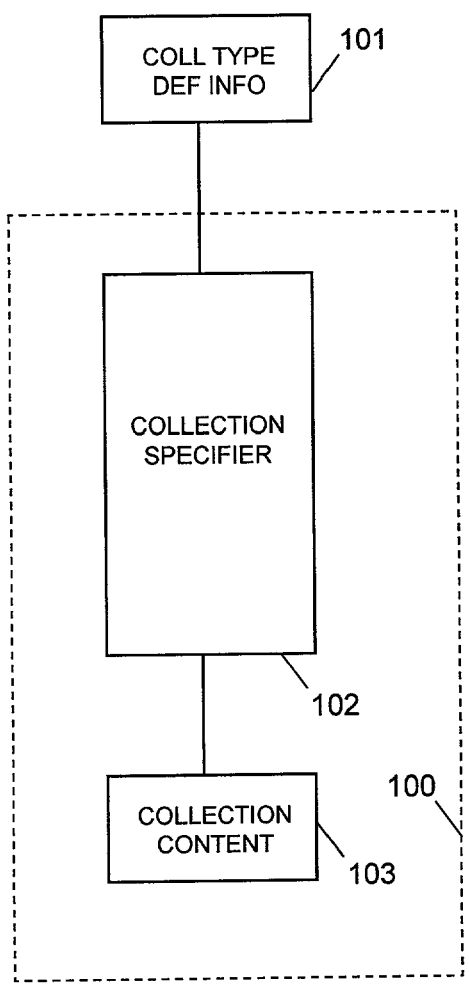
FIG. 4 shows four major information groupings for collections, including collection type definition 101, collection specifier 102, collection content 103, and collection 100.

100 A collection formed from a prior art folder
101 Collection type definition information
102 Collection specifier information
103 Collection content information
104 Per-collection collection processing information
105 Per-collection collection type indicator
106 Per-collection content link specifiers
107 Collection information source means
110 Application program
111 Collection information manager means
112 Collection type definition API means
113 Collection specifier API means
114 Collection content API means
115 Collection type definition server means
116 Collection specifier server means
117 Collection content server means

DETAILED DESCRIPTION

Overview of Collections

This section introduces collections and some related terminology.

Collections are sets of computer files that can be manipulated as a set, rather than as individual files. Collection information is comprised of three major parts: (1) a collection specifier that contains information about a collection instance, (2) a collection type definition that contains information about how to process all collections of a particular type, and (3) optional collection content in the form of arbitrary computer files that belong to a collection.

Collection specifiers contain information about a collection instance. For example, collection specifiers may define such things as the collection type, a text summary description of the collection, collection content members, derivable output products, collection processing information such as process parallelism limits, special collection processing steps, and program option overrides for programs that manipulate collections. Collection specifiers are typically implemented as simple key-value pairs in text files or database tables.

Collection type definitions are user-defined sets of attributes that can be shared among multiple collections. In practice, collection specifiers contain collection type indicators that reference detailed collection type definitions that are externally stored and shared among all collections of a particular type. Collection type definitions typically define such things as collection types, product types, file types, action types, administrative policy preferences, and other information that is useful to application programs for understanding and processing collections.

Collection content is the set of all files and directories that are members of the collection. By convention, all files and directories recursively located within an identified set of sub-trees are usually considered to be collection members. In addition, collection specifiers can contain collection content directives that add further files to the collection membership. Collection content is also called collection membership.

Collection is a term that refers to the union of a collection specifier and a set of collection content.

Collection information is a term that refers to the union of collection specifier information, collection type definition information, and collection content information.

Collection membership information describes collection content.

Collection information managers are software modules that obtain and organize collection information from collection information stores into information-rich collection data structures that are used by application programs.

Collection Physical Representations—Main Embodiment

FIGS. 1-3 show the physical form of a simple collection, as would be seen on a personal computer filesystem.

FIG. 1 shows an example prior art filesystem folder from a typical personal computer filesystem. The files and directories shown in this drawing do not implement a collection 100, because no collection specifier 102, FIG. 2 Line 5 exists to associate a collection type definition FIG. 4 101 with collection content information FIG. 4 103.

FIG. 2 shows the prior art folder of FIG. 1, but with a portion of the folder converted into a collection 100 by the addition of a collection specifier file FIG. 2 Line 5 named "cspec". In this example, the collection contents 103 of collection 100 are defined by two implicit policies of a preferred implementation.

First is a policy to specify that the root directory of a collection is a directory that contains a collection specifier file. In this example, the root directory of a collection 100 is a directory named "c-myhomepage" FIG. 2 Line 4, which in turn contains a collection specifier file 102 named "cspec" FIG. 2 Line 5.

Second is a policy to specify that all files and directories in and below the root directory of a collection are part of the collection content. Therefore directory "s" FIG. 2 Line 6, file "homepage.html" FIG. 2 Line 7, and file "myphoto.jpg" FIG. 2 Line 8 are part of collection content 103 for said collection 100.

FIG. 3 shows an example physical representation of a collection specifier file 102, FIG. 2 Line 5, such as would be used on a typical personal computer filesystem.

Collection Information Types

Figure 5:
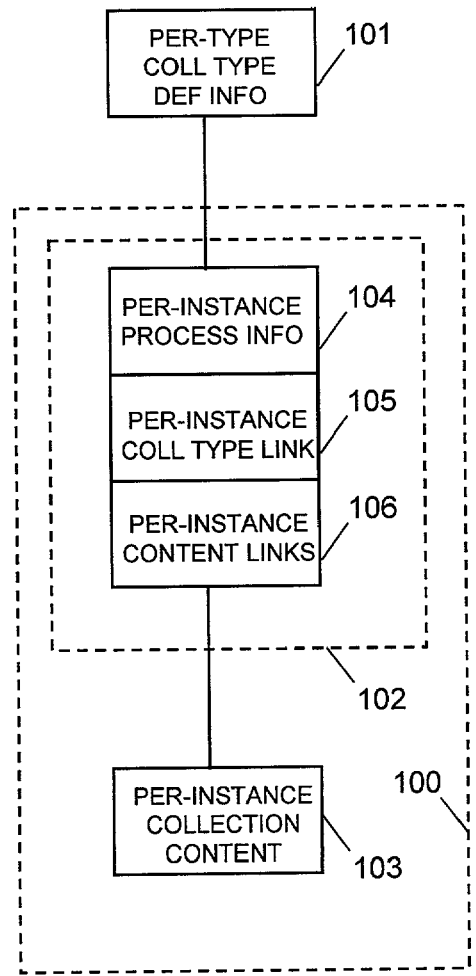
FIG. 5 shows a more detailed view of the information groupings in FIG. 4, illustrating several particular kinds of per-collection-instance and per-collection-type information.

FIGS. 4-5 show three main kinds of information that comprise collection information.

FIG. 4 shows a high-level logical structure of three types of information that comprise collection information: collection processing information 101, collection specifier information 102, and collection content information 103. A logical collection 100 is comprised of a collection specifier 102 and collection content 103 together. This diagram best illustrates the logical collection information relationships that exist within a preferred filesystem implementation of collections.

FIG. 5 shows a more detailed logical structure of the same three types of information shown in FIG. 4. Collection type definition information FIG. 4 101 has been labeled as per-type information in FIG. 5 103 because there is only one instance of collection type information 101 per collection type. Collection content information FIG. 4 103 has been labeled as per-instance information in FIG. 5 103 because there is only one instance of collection content information per collection instance. Collection specifier information 102 has been partitioned into collection instance processing information 104, collection-type link information 105, and collection content link information 106. FIG. 5 is intended to show several important types of information 104-106 that are contained within collection specifiers 102.

Figure 6:
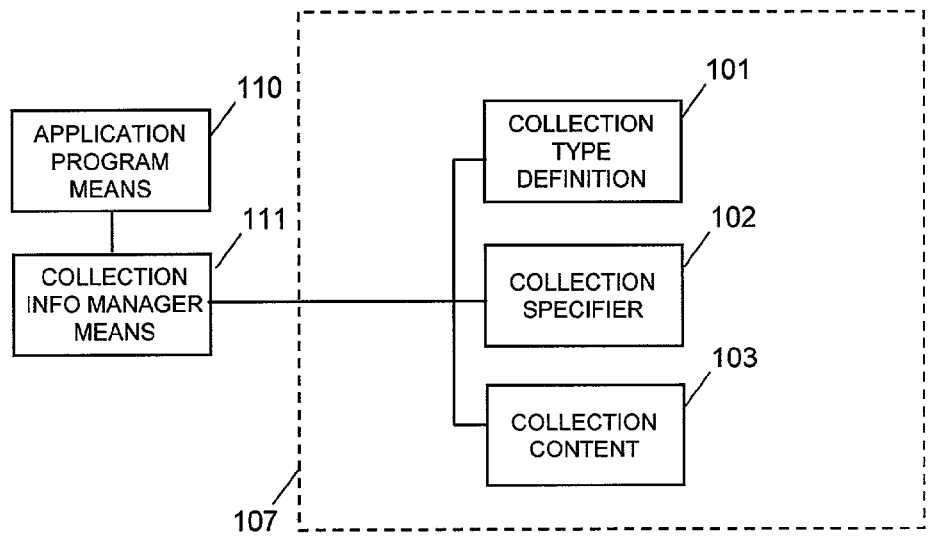
FIG. 6 shows a logical diagram of how a Collection Information Manager Means 111 would act as an interface between an application program means 110 and a collection information means 107, including collection information sources 101-103.

Suppose that an application program means FIG. 6 110 knows (a) how to obtain collection processing information 101, (b) how to obtain collection content information 103, and (c) how to relate the two with per-collection-instance information 102. It follows that application program means FIG. 6 110 would have sufficient knowledge to use collection processing information 101 to process said collection content 103 in useful ways.

Collection specifiers 102 are useful because they enable all per-instance, non-collection-content information to be stored in one physical location. Collection content 103 is not included in collection specifiers because collection content 103 is often large and dispersed among many files.

All per-collection-instance information, including both collection specifier 102 and collection content 103, can be grouped into a single logical collection 100 for illustrative purposes.

Collection Application Architectures

Figure 7:
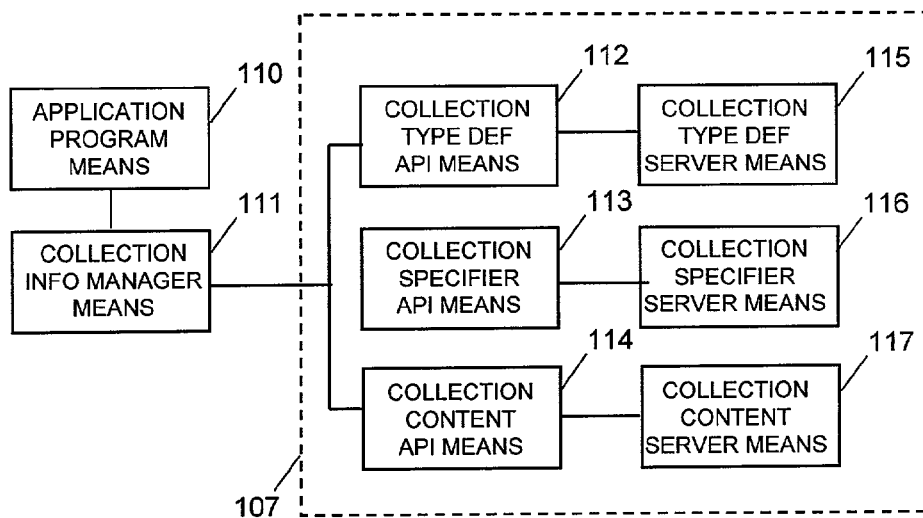
FIG. 7 shows a physical software embodiment of how an Application Program Means 110 would use a Collection Information Manager Means 111 to obtain collection information from various collection information API means 112-114 connected to various collection information server means 115-117.

FIGS. 6-7 show example collection-enabled application program architectures.

FIG. 6 shows how a collection information manager means 111 acts as an interface between an application program means 110 and collection information means 107 that includes collection information sources 101-103. Collectively, collection information sources 101-103 are called a collection information means 107. A collection information manager means 111 represents the union of all communication mechanisms used directly or indirectly by an application program means 110 to interact with collection information sources 101-103.

FIG. 7 shows a physical software embodiment of how an application program means 110 could use a collection information manager means 111 to obtain collection information from various collection information API (Application Programming Interface) means 112-114 connected to various collection information server means 115-117.

Collection type definition API means 112 provides access to collection type information available from collection type definition server means 115. Collection specifier API means 113 provides access to collection specifier information available from collection specifier server means 116. Collection content API means 114 provides access to collection content available from collection content server means 117.

API means 112-114, although shown here as separate software components for conceptual clarity, may optionally be implemented wholly or in part within a collection information manager means 111, or within said server means 115-117, without loss of functionality.

API means 112-114 may be implemented by any functional communication mechanism known to the art, including but not limited to command line program invocations, subroutine calls, interrupts, network protocols, or file passing techniques.

Server means 115-117 may be implemented by any functional server mechanism known to the art, including but not limited to database servers, local or network file servers, HTTP web servers, FTP servers, NFS servers, or servers that use other communication protocols such as TCP/IP, etc.

Server means 115-117 may use data storage means that may be implemented by any functional storage mechanism known to the art, including but not limited to magnetic or optical disk storage, digital memory such as RAM or flash memory, network storage devices, or other computer memory devices.

Collection information manager means 111, API means 112-114, and server means 115-117 may each or all optionally reside on a separate computer to form a distributed implementation. Alternatively, if a distributed implementation is not desired, all components may be implemented on the same computer.

Collection Data Structures

FIGS. 8-10 show several major collection data structures.

FIG. 8 shows an example collection datastructure that contains collection specifier and collection content information for a collection instance. Application programs could use such a datastructure to manage collection information for a collection that is being processed.

In particular, preferred implementations would use collection datastructures to manage collection information for collections being processed. The specific information content of a collection datastructure is determined by implementation policy. However, a collection specifier typically contains at least a collection type indicator FIG. 8 Line 4 to link a collection instance to a collection type definition.

FIG. 9 shows an example collection type definition datastructure that could be used by application programs to process collections. Specific information content of a collection type definition datastructure is determined by implementation policy. However, collection type definitions typically contain information such as shown in FIGS. 9-10.

FIG. 10 shows example information content for a collection type definition datastructure such as shown in FIG. 9. FIG. 10 shows information concerning internal collection directory structures, collection content location definitions, collection content datatype definitions, collection processing definitions, and collection results processing definitions. The specific information content of a collection type definition is determined by implementation policy. If desired, more complex definitions and more complex type definition information structures can be used to represent more complex collection structures, collection contents, or collection processing requirements.

Operation of the Main Embodiment

FIG. 7 shows a software architecture for an Application Program Means 110 using a Collection Information Manager Means 111 to obtain collection information from various collection information API means 112-114 connected to various collection information server means 115-117.

In operation, Collection Information Manager 111 proceeds according to the simplified algorithm shown in FIG. 11.

Initially, an Application Program Means 110 calls a Collection Information Manager 111 to obtain collection data structures for a collection 100 of interest to the application program. The application program passes collection identification information to Collection Information Manager 111 as part of the invocation.

Next the Collection Information Manager 111 uses Collection Specifier API Means 113 to obtain collection specifier information from one of a possible plurality of Collection Specifier Server Means 116. Collection Information Manager 111 loads the obtained collection specifier information into a collection data structure such as shown in FIG. 8, or equivalent.

Next the Collection Information Manager 111 continues to accumulate information about the identified collection 100 by extracting a collection type indicator FIG. 3 Line 2 from the previously-obtained collection specifier information 102. The collection type indicator FIG. 3 Line 2 points to detailed collection type definition information such as that shown in FIG. 10. Collection Information Manager 111 uses the collection type indicator FIG. 3 Line 2 to obtain complete collection type definition information 101, via Collection Type Definition API Means 112, from one of a possible plurality of Collection Type Definition Server Means 115. Collection Information Manager 111 loads the obtained collection type information into a collection type data structure such as shown in FIG. 9, or equivalent.

Continuing, Collection Information Manager 111 further obtains collection content location and recognition information from the complete collection type definition information 101, FIG. 10. Collection Information Manager 111 uses the location and recognition information from the type definition 101 to obtain collection content information 103 for the collection 100 of interest, and loads the obtained collection content information 103 into a collection data structure such as shown in FIG. 8, or equivalent.

Collection Information Manager 111 has now obtained, associated, and organized three kinds of information 101-103 for the collection 100 being processed into collection data structures FIGS. 8-9. Collection Information Manager 111 now passes the collection data structures FIG. 8-9 containing the organized information to Application Program Means 110 for use in processing collection 100.

Application Program Means 110 now has complete knowledge of the identified collection 100. In particular, collection information from the collection specifier 102, collection type definition 101, and collection content information 103 has been made available to the application program in the form of convenient collection data structures FIGS. 8-9. Application Program Means 110 can now process said collection 100 in the presence of detailed collection information.

All operations described herein to obtain, associate, and provide collection data structures are simple, and easily implemented by one of ordinary skill in the art. For example, the preferred embodiment uses only simple text files to contain collection specifier, collection content, and collection type information. Therefore operations are essentially comprised of reading and parsing simple text files. Similarly, creating data structures and assigning values to data structure fields are described at length in textbooks, in the computer programming literature, and in many freeware programs available on the Internet.

Where more complex distributed network implementations are contemplated, it is reasonable to expect that more implementation skill is required. But even so, the required network communication mechanisms are well described in many textbooks, in the computer networking literature, and at length in detailed source code format as found in numerous freeware programs available on the Internet.

Collection Categories

FIG. 12 shows 4 important collection categories, organized by the two properties of (a) having a collection type and (b) having content.

Category 1 collections have a collection type and content, and are the most common category of collection. Application programs processing category 1 collections use collection type information to understand and process collection content.

Category 2 collections have a type, but no content, and are the second most common category of collection. Since they have no content, category 2 collections are valued purely for information contained in, or derivable from, the collection specifier and collection type definition.

Category 3 collections have no type, but they do have specifiers and content. Since Category 3 collections have no type, they can only be used effectively by application programs that use predefined collection types and processes. Without types, these collections are essentially useless for collection processing operations that depend upon the presence of a particular collection type definition.

Category 4 collections have no type and no content, so they are not useful for normal collection operations. However, these collections do serve as useful initial starting points for collection generator programs that generate collection types and content.

Advantages

From the foregoing description, a number of additional advantages of the present invention are evident.

Collections support the aggregation of arbitrary numbers of computer files into collections that can be associated with user-defined, computer-readable collection types. Therefore the present invention is scalable and customizable in nature.

Collection types support the automated recognition of collections by application programs, which can associate collections with sets of characteristics and processing requirements that are peculiar to, and shared by, all collections of a particular type. Therefore the invention enables automated processing of collections to occur in accordance with existing, predefined knowledge for the collection type, and in the presence of more detailed knowledge about collections than was previously available.

Collection type definitions can be customized by local sites to accomodate local site policies and preferences. Collection information managers at receiving sites therefore enable mobile collection instances to be associated with customized local processing conventions at the receiving site, using local collection type definitions to guide processing. Accordingly, identical mobile copies of a collection can be treated correctly, yet differently, at each one of a plurality of sites, according to local site policies and preferences defined by local collection type definitions.

Conclusion

The present Collection Information Manager invention provides a practical solution to the fundamental collection information management problem that is faced by builders of automated collection processing systems. In particular, collection information managers provide general, flexible, customizable, extensible, mobile, scalable, and robust collection information support to automated software processing systems.

As can be seen from the foregoing disclosure, the present collection information manager invention provides application programs with a practical means for obtaining precise collection instance, content, and processing information in an automated, customizable, and scalable way that was not previously available.

Ramifications

Although the foregoing descriptions are specific, they should be considered as sample embodiments of the invention, and not as limitations. Those skilled in the art will understand that many other possible ramifications can be imagined without departing from the spirit and scope of the present invention.

General Software Ramifications

The foregoing disclosure has recited particular combinations of program architecture, data structures, and algorithms to describe preferred embodiments. However, those of ordinary skill in the software art can appreciate that many other equivalent software embodiments are possible within the teachings of the present invention.

As one example, data structures have been described here as coherent single data structures for convenience of presentation. But information could also be could be spread across a different set of coherent data structures, or could be split into a plurality of smaller data structures for implementation convenience, without loss of purpose or functionality.

As a second example, particular software architectures have been presented here to more strongly associate primary algorithmic functions with primary modules in the software architectures. However, because software is so flexible, many different associations of algorithmic functionality and module architecture are also possible, without loss of purpose or technical capability. At the under-modularized extreme, all algorithmic functionality could be contained in one software module. At the over-modularized extreme, each tiny algorithmic function could be contained in a separate software module.

As a third example, particular simplified algorithms have been presented here to generally describe the primary algorithmic functions and operations of the invention. However, those skilled in the software art know that other equivalent algorithms are also easily possible. For example, if independent data items are being processed, the algorithmic order of nested loops can be changed, the order of functionally treating items can be changed, and so on.

Those skilled in the software art can appreciate that architectural, algorithmic, and resource tradeoffs are ubiquitous in the software art, and are typically resolved by particular implementation choices made for particular reasons that are important for each implementation at the time of its construction. The architectures, algorithms, and data structures presented above comprise one such conceptual implementation, which was chosen to emphasize conceptual clarity.

From the above, it can be seen that there are many possible equivalent implementations of almost any software architecture or algorithm, regardless of most implementation differences that might exist. Thus when considering algorithmic and functional equivalence, the essential inputs, outputs, associations, and applications of information that truly characterize an algorithm should also be considered. These characteristics are much more fundamental to a software invention than are flexible architectures, simplified algorithms, or particular organizations of data structures.

Practical Applications

Collection information managers and collection models can be used in various practical applications.

One possible application is to improve the productivity of human computer programmers, by providing them with a way of sharing collection type definition among many collections. Multiple copies of type definition are thereby avoiding, reducing information maintenance costs.

Another application is to share collection type definition knowledge among many application programs, thereby reusing collection type definition information multiple times, and thereby gaining leverage from one-time investments in constructing collection type definitions.

Another application is to improve the processing capabilities of application programs by providing them with more detailed and more precise information about collections that are to be processed.

Functional Enhancements

One possible functional enhancement is to modify a collection information manager to perform quality checks on collections. For example, the structure and content of collection specifiers could be examined to ensure that collection specifier, collection type definition, and collection content information could be properly obtained and associated at application runtime. This enhancement would help humans to construct valid collections without using particular application programs.

Another possible enhancement is to modify a collection information manager to partially or fully generate various components of a collection, thereby improving productivity of humans that construct collections.

Another possible enhancement is to modify a collection information manager to upgrade or convert existing collections into new collection formats that may be defined by an implementation from time to time, thereby improving productivity of human collection maintainers, and reducing information maintenance costs.

Collection Specifier Variations

Arbitrary types of per-instance information can be stored in collection specifiers, according to collection and local site processing requirements.

For example, specifiers might describe how collection content is organized into subdirectories, what results should be produced by processing the collection, what external collection content should be used during processing, what special processing options should be used by particular application programs, and so on. Special per-instance instructions to arbitrary application programs, and special content additions can also be stored in collection specifiers. Specific content and format decisions for collection specifiers are policy decisions determined by the implementation.

In another possible embodiment, collection specifier contents could be dynamically calculated by the collection information manager at runtime, rather than being statically defined within a text file. This approach, although considerably more complex than using text file specifiers, would allow implementations to effectively change the contents of all collection specifiers within a system, without having to physically modify text specifier files.

Collection Type Indicator Variations

Although the collection specifier 102 example shown in FIG. 3 contained an explicit collection type indicator Line 2, other implementations of collection type indicators are possible. For example, a collection information manager might derive a collection type indicator from other information contained within the specifier. This approach would allow for dynamic calculation of collection types at the time of collection processing, and would enable local sites to change their collection type policies without modifying the specifier contents of large numbers of existing collections.

Collection Content Variations

Arbitrary types of collection content information may be used within a collection. For example, collection content may include passive data files, control files that control collection processing by application programs, executable files, application data files used by the application as a standard part of its function, and so on. Collection content may even include whole systems of files that implement large databases.

Note that collection content is optional, and is often not required to perform useful work. Sometimes useful processing can be represented within the specifier or type definitions alone. For example, this is the case when a type definition contains executable command sequences that do not require data files within the collection content to be objects of the commands.

Specific conventions for collection content are policy decisions determined by the implementation.

Collection Type Definition Variations

Arbitrary types of collection type definition information may be included within a collection type definition. For example, collection type definitions might describe collection internal directory structures, collection processing options, collection file recognition policies, collection content location boundaries, collection precedence orderings, collection default process types, and so on. Any information useful for processing collections can legitimately be stored within a collection type definition. Specific conventions for collection type definitions are policy decisions determined by the implementation.

Although FIG. 10 shows a linear structure for collection type definition, more complex data structures are possible. For example, large amounts of type definition information could be organized into one or more hierarchies, or could be organized into a plurality of relational data base tables.

In a preferred embodiment, collection type definitions are typically stored outside collection specifier files, to promote sharing of type definition information among multiple collections. However, there is no requirement to do so. Complete collection type definitions may also be stored within the default collection content subtree, or within the collection specifier itself. For example, a collection specifier containing type definition information could be constructed by appending the collection type definition information shown in FIG. 10 to the end of the collection specifier file shown in FIG. 3. The main advantage of storing type definition information within a collection or collection specifier is that it makes the resulting collection completely self-contained, and not dependent on local site type definitions. The main disadvantage is that no sharing of type information occurs, so multiple copies of the same type information can result, and can lead to higher software maintenance costs.

If type information is stored within a collection specifier, an explicit collection type indicator may not be required to link the collection specifier instance to corresponding collection type definition information. Instead, type definition information could be read directly from the collection specifier, without requiring an intermediate linking step involving a collection type indicator. The main advantage of this approach is added simplicity by virtue of no required linking, and no external type definition information.

The main disadvantage is that no sharing of type definition information occurs, leading to multiple copies of the same type definition information and to higher software maintenance costs.

Alternative Embodiments

In one alternative embodiment, all known collections could be stored and managed within a comprehensive collection management implementation. Collections would thereby be fully contained within a management system that provided useful collection management services to application programs. For example, application programs could easily identify collections to process simply by asking the collection management implementation directly for interesting collections.

In another alternative embodiment, collection information could be partially or wholly stored within a relational database. In this implementation, application programs would use a collection information manager capable of interacting with databases, typically using SQL language to work with collection information stored in a database server means. One advantage of this embodiment would be that application programs and humans could use an industry-standard database language such as SQL (Structured Query Language) to work with collections.

In still other embodiments, more powerful representations could be used to store collection information. For example, markup languages such as SGML or XML could be used to store collection specifier and collection type information. This approach would have the advantage of using a more structured, more formal language for organizing collection information. In addition, more powerful software programs designed to work with SGML or XML could also be used to parse and manage collection information.

Distributed Embodiments

In distributed embodiments of the invention, various components could be combined or distributed to meet implementation preferences.

For example, in one distributed embodiment, collection specifier information could be stored in a database, while collection content could be stored in a normal filesystem. This would be a reasonable approach in cases where large numbers of arbitrary content files would be too awkward to store within a database. In this implementation, collection specifier information inside the database could point to the location of content files stored outside the database.

In another distributed embodiment, collection content might be distributed between both a database and normal file storage. Part of the content could reside in a database, and part of the content would reside in a normal computer files within a filesystem.

In a third distributed embodiment, all collection information might be obtained and managed over a collection-aware network protocol that could manage collection information directly. In this kind of implementation, local physical files containing collection specifiers and perhaps even content files might not be required on the local computing system. Instead, application programs would load network-provided collection information directly into application memory, and manipulate collection information without ever reading from or writing to a computer storage disk.

In a fourth distributed embodiment, a collection information manager could be implemented as a standalone collection server program. In this embodiment, application programs would interact with the collection information manager server program to obtain collection information required for application processing.

Collection Type Server Embodiments

One important distributed embodiment is a collection type definition information server. In this example, a dedicated server is connected to a network for the purpose of providing commonly used collection type definition information to client programs that process collections.

The main advantages of this embodiment derive from centralization of collection processing knowledge in the form of centralized collection type definitions. In this configuration, many users could share commonly used, standardized processes.

One advantage of centralized collection processing knowledge is that collection processes being used by many client programs can be easily upgraded by changing a single centralized copy of the information.

A second advantage of centralization is that commercialization and extension of collection processing knowledge is enabled, because clients can pay for predetermined collection processing knowledge that meets their needs. E-commerce in complex collection processing knowledge is thereby enabled, providing clients with an effective, efficient alternative to human consultants in applicable cases.

As can be seen by one of ordinary skill in the art, many other distributed implementation and usage ramifications are also possible within the teachings of this disclosure.

SCOPE

The present invention is not limited to any particular computer architecture, operating system, filesystem, database, or other software implementation.

Therefore the full scope of the present invention should be determined by the accompanying claims and their legal equivalents, rather than from the examples given in the specification.

I claim:

1. A collection information manager process for associating a collection instance with corresponding collection type definition information, to be performed on or with the aid of a programmable device, comprising the following steps:

(a) obtaining collection specifier information for a collection instance, (b) deriving a collection type indicator from said collection specifier information, (c) using said collection type indicator to obtain corresponding collection type definition information for said collection instance, wherein collections are data structures comprised of a collection specifier and collection content containing zero or more collection content files, and wherein collection specifiers contain information about collection instances, and wherein collection type definitions are user-defined sets of attributes that are useful to application programs for understanding and processing collections, thereby associating said collection instance with corresponding collection type definition information, and thereby providing a solution to the collection information management problem, and thereby enabling software programs to process collection instances more knowledgeably, in the presence of detailed, corresponding collection type definition information.

2. The process of claim 1, further comprising
(a) using said collection type definition information to obtain corresponding collection content information for said collection instance,
thereby providing software programs with relevant and detailed collection content information for said collection instance, and thereby enabling software programs to perform collection processing operations on collection instances that were not previously possible in the absence of collection content information.

3. The process of claim 1, further comprising
(a) writing said collection specifier information into a collection data structure,
(b) writing said collection type definition information into a collection type definition data structure, and
(c) making said collection data structure and said collection type definition data structure available for use by a calling software program,
thereby providing software programs with a practical means for obtaining detailed collection type definition information for collection instances, and thereby enabling software programs, guided by said collection specifier information and said collection type definition information, to perform collection processing operations that were not previously possible.

4. The process of claim 1, wherein
(a) said step of obtaining collection specifier information uses a collection specifier API means,
thereby increasing the network accessibility and scalability of said process for making collection information available to said software program.

5. The process of claim 1, wherein
(a) said step of obtaining collection type definition information uses a collection type definition API means,
thereby increasing the network accessibility and scalability of said process for making collection information available to said software program.

6. The process of claim 2, wherein
(a) said step of obtaining collection content information uses a collection content API means,
thereby increasing the network accessibility and scalability of said process for making collection information available to said software program.

7. A programmable collection information manager device for associating a collection instance with corresponding collection type definition information, whose actions are directed by software executing a process comprising the following steps:
(a) obtaining collection specifier information for a collection instance,
(b) deriving a collection type indicator from said collection specifier information,
(c) using said collection type indicator to obtain corresponding collection type definition information for said collection instance,
wherein collections are data structures comprised of a collection specifier and collection content containing zero or more collection content files, and wherein collection specifiers contain information about collection instances, and wherein collection type definitions are user-defined sets of attributes that are useful to application programs for understanding and processing collections,
thereby associating said collection instance with corresponding collection type definition information, and thereby providing a solution to the collection information management problem, and thereby enabling software programs to process collection instances more knowledgeably, in the presence of detailed, corresponding collection type definition information.

8. The programmable device of claim 7, further comprising
(a) using said collection type definition information to obtain corresponding collection content information for said collection instance,
thereby providing software programs with relevant and detailed collection content information for said collection instance, and thereby enabling software programs to perform collection processing operations on collection instances that were not previously possible in the absence of collection content information.

9. The programmable device of claim 7, further comprising
(a) writing said collection specifier information into a collection data structure,
(b) writing said collection type definition information into a collection type definition data structure, and
(c) making said collection data structure and said collection type definition data structure available for use by a calling software program,
thereby providing software programs with a practical means for obtaining detailed collection type definition information for collection instances, and thereby enabling software programs, guided by said collection specifier information and said collection type definition information, to perform collection processing operations that were not previously possible.

10. The programmable device of claim 7, wherein
(a) said step of obtaining collection specifier information uses a collection specifier API means,
thereby increasing the network accessibility and scalability of said process for making collection information available to said software program.

11. The programmable device of claim 7, wherein
(a) said step of obtaining collection type definition information uses a collection type definition API means,
thereby increasing the network accessibility and scalability of said process for making collection information available to said software program.

12. The programmable device of claim 8, wherein
(a) said step of obtaining collection content information uses a collection content API means,
thereby increasing the network accessibility and scalability of said process for making collection information available to said software program.

13. A computer readable memory, encoded with data representing a computer program, that can be used to direct a computer when used by the computer, comprising:
(a) means for obtaining collection specifier information for a collection instance,
(b) means for deriving a collection type indicator from said collection specifier information, and
(c) means for using said collection type indicator to obtain corresponding collection type definition information for said collection instance,
wherein collections are data structures comprised of a collection specifier and collection content containing zero or more collection content files, and wherein collection specifiers contain information about collection instances, and wherein collection type definitions are user-defined sets of attributes that are useful to application programs for understanding and processing collections,
thereby providing means for associating said collection instance with corresponding collection type definition information, and thereby providing a solution to the collection information management problem, and thereby enabling software programs to process collection instances more knowledgeably, in the presence of detailed, corresponding collection type definition information.

14. The computer readable memory of claim 13, further comprising
(a) means for using said collection type definition information to obtain corresponding collection content information for said collection instance,
thereby providing software programs with relevant and detailed collection content information for said collection instance, and thereby enabling software programs to perform collection processing operations on collection instances that were not previously possible in the absence of collection content information.

15. The computer readable memory of claim 13, further comprising
(a) means for writing said collection specifier information into a collection data structure,
(b) means for writing said collection type definition information into a collection type definition data structure, and
(c) means for making said collection data structure and said collection type definition data structure available for use by a calling software program,
thereby providing software programs with a practical means for obtaining detailed collection type definition information for collection instances, and thereby enabling software programs, guided by said collection specifier information and said collection type definition information, to perform collection processing operations that were not previously possible.

16. The computer readable memory of claim 13, wherein
(a) said means for obtaining collection specifier information uses a collection specifier API means,
thereby providing means for increasing the network accessibility and scalability of said process for making collection information available to said software program.

17. The computer readable memory of claim 13, wherein
(a) said means for obtaining collection type definition information uses a collection type definition API means,
thereby providing means for increasing the network accessibility and scalability of said process for making collection information available to said software program.

18. The computer readable memory of 14, wherein
(a) said means for obtaining collection content information uses a collection content API means,
thereby providing means for increasing the network accessibility and scalability of said process for making collection information available to said software program.

19. A computer readable memory containing data with a structure capable of causing a programmable device to operate in a particular manner, the structure comprising:

(a) a compilation of collection type definition information for one or more collection types, organized according to collection type, and containing collection processing information,
(b) means for using a collection type indicator from a request for collection type information initiated by a request originator to obtain corresponding collection type definition information from said compilation, and
(c) means for returning said obtained collection type definition information to said request originator,
wherein collections are data structures comprised of a collection specifier and collection content containing zero or more collection content files, and wherein collection specifiers contain information about collection instances, and wherein collection type definitions are user-defined sets of attributes that are useful to application programs for understanding and processing collections,
thereby providing automated collection processing programs with a practical means for reusing an existing compilation of collection type definition knowledge.

20. A programmable collection information manager device for making collection type definition information directly available over a network connection, whose actions are directed by software executing a process comprising the following steps:
(a) in response to an incoming network request for collection type definition information, wherein said network request contains a collection type indicator, obtaining corresponding collection type definition information using a collection type definition API means connected to at least one collection type definition server means,
(b) writing said obtained collection type definition information into a collection type definition data structure, and
(c) sending said obtained corresponding collection type definition information stored in said collection type definition data structure over the network in response to said incoming query,
wherein collections are data structures comprised of a collection specifier and collection content containing zero or more collection content files, and wherein collection specifiers contain information about collection instances, and wherein collection type definitions are user-defined sets of attributes that are useful to application programs for understanding and processing collections,
thereby implementing a scalable network service for providing shared collection type definition information to automated collection processing programs, and thereby providing an automated, scalable means for storing and reusing human collection processing knowledge, toward the goal of reducing the knowledge burden required of knowledge workers who currently perform repetitive manual processes on collections of files.

* * * * *